Figure 1:
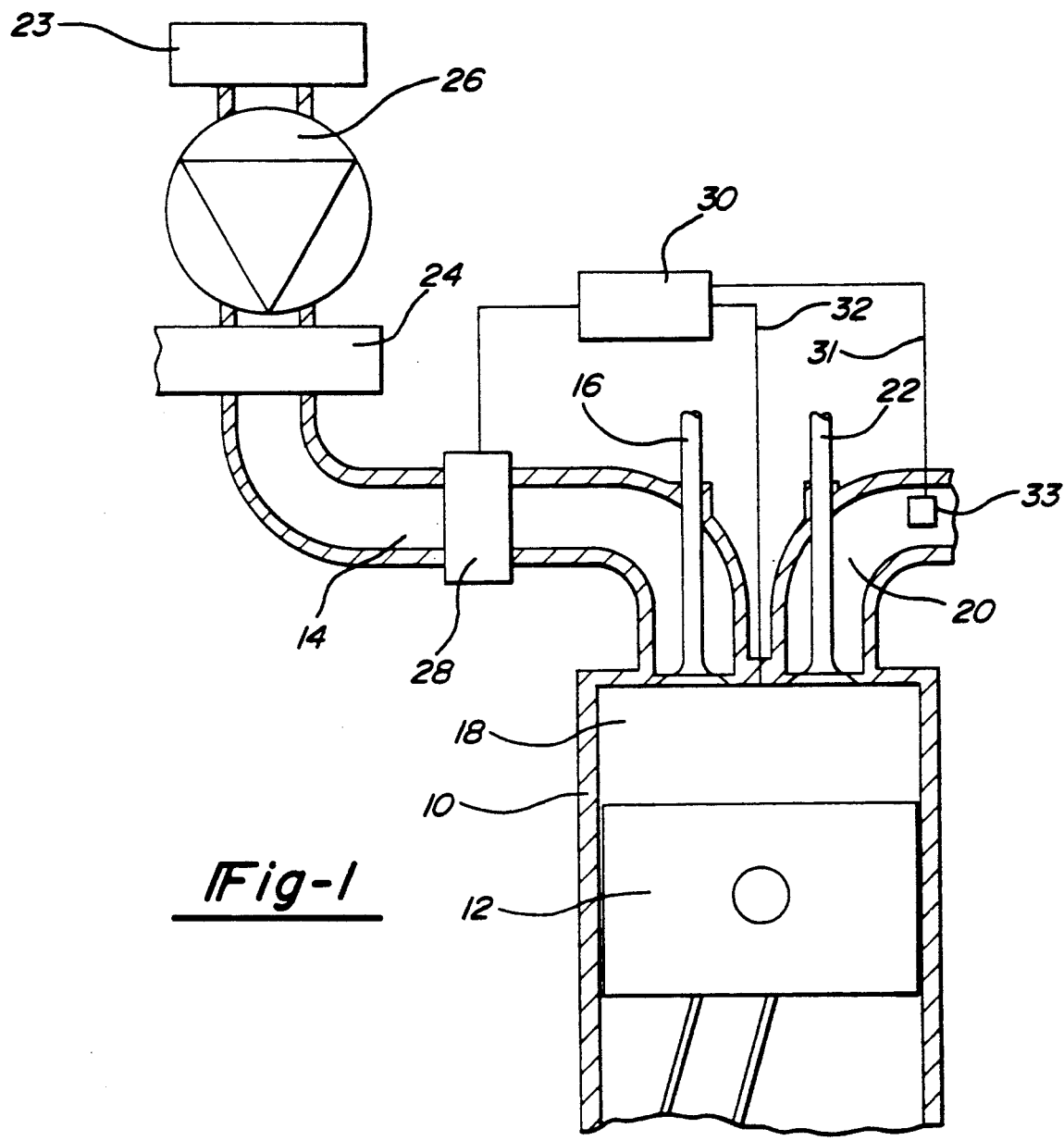

United States Patent
Schatz

Patent Number: 5,299,549
Date of Patent: Apr. 5, 1994

[54] METHOD OF CONTROLLING THE FUEL-AIR RATIO OF AN INTERNAL COMBUSTION ENGINE

[76] Inventor: Oskar Schatz, Waldpromenade 16, D-8035 Gauting, Fed. Rep. of Germany

[21] Appl. No.: 990,902

[22] Filed: Dec. 15, 1992

[30] Foreign Application Priority Data

Dec. 16, 1991 [DE] Fed. Rep. of Germany ....... 4141481

[51] Int. Cl.⁵ ..................... F02D 41/06; F02D 41/14
[52] U.S. Cl. .................................................. 123/672
[58] Field of Search ............ 123/21, 64, 52 MF, 90.11, 123/316, 337, 376, 378, 403, 672, 673, 674, 697

[56] References Cited

U.S. PATENT DOCUMENTS

| | | | |
|---|---|---|---|
| 4,231,335 | 11/1980 | Hallberg et al. | 123/701 |
| 4,426,972 | 1/1984 | Kimura et al. | 123/378 |
| 4,467,601 | 8/1984 | Watanabe | 123/376 X |
| 4,641,613 | 2/1987 | Delesalle | 123/64 X |
| 4,655,182 | 4/1987 | Nakano et al. | 123/697 X |
| 4,721,088 | 1/1988 | Mieno et al. | 123/697 X |
| 4,771,752 | 9/1988 | Nishimura et al. | 123/672 X |
| 4,802,452 | 2/1989 | Kanesaka | 123/316 X |
| 4,945,870 | 8/1990 | Richeson | 123/64 X |
| 4,958,606 | 9/1990 | Hitomi et al. | 123/316 |
| 5,074,268 | 12/1991 | Schatz et al. | 123/403 |
| 5,080,064 | 1/1992 | Buslepp et al. | 123/674 X |

FOREIGN PATENT DOCUMENTS

| | | |
|---|---|---|
| 3729771 | 3/1989 | Fed. Rep. of Germany . |
| 2469569 | 5/1981 | France . |

*Primary Examiner*—Willis R. Wolfe
*Attorney, Agent, or Firm*—Harness, Dickey & Pierce

[57] ABSTRACT

In a method of controlling the fuel-air ratio of an internal combustion engine the combustion chamber and its contents are preheated at times when the engine is started from cold and during other operative conditions of thermal energy deficiency. The engine is operated with a lean fuel-air mixture from the very beginning when the engine is started, and the fuel-air ratio is controlled exclusively by oxygen sensor means in the exhaust gas.

2 Claims, 1 Drawing Sheet

METHOD OF CONTROLLING THE FUEL-AIR RATIO OF AN INTERNAL COMBUSTION ENGINE

The present invention relates to a method of controlling the fuel-air ratio of an internal combustion engine in particular of the piston cylinder type.

In the art of internal combustion engines it has become known to increase the temperature in the combustion chamber at times when the engine is started from cold and during other operative conditions of thermal energy deficiency in order to ensure early ignition of the engine and to reduce the emission of pollutants and to cut down the fuel consumption rate.

A known measure is to preheat the combustion air in a heat exchanger before being fed into the engine cylinder.

In order to determine the fuel-air ratio in internal combustion engines, carburetors or air mass flow rate sensors (in connection with engines of the fuel injection type) are used. Additionally oxygen sensor means in the exhaust gas stream are used in automotive vehicles that are equipped with three-way catalytic converters. Such oxygen sensor means are suited to rapidly provide the necessary sensed data; however, they are effective only until after a predetermined operative temperature of the engine has been reached. Furthermore, they function properly only when the engine can be operated with an fuel-air mixture such that the exhaust gas contains a certain amount of residual oxygen, i.e. with a fuel-air mixture having an air coefficient lambda $\geq 1$; this is why carburetors and air mass flow rate sensors in connection with engines of the fuel injection type have not been dispensed with also in engines equipped with three-way catalytic converters.

Presently there are three common modes of operation of internal combustion engines including engines both of the carburetor type and the fuel injection type, namely operation without a catalytic converter, operation with an uncontrolled catalytic converter and operation with a controlled three-way catalytic converter.

In the operation of an engine provided with a three-way catalytic converter an oxygen sensor in the exhaust gas—additional to the use of a carburetor or fuel injection means along with air mass flow sensing means—is required to precisely sense the actual fuel-air ratio in order to enable a precise control of the actual operative condition of the engine according to an optimal fuel-air ratio.

In the operation of an engine provided with a three-way catalytic converter the carburetor or the air mass flow sensor is required only to enable operation of the engine when it is still cold, at which times the exhaust gas does not contain any excess air because the engine must be operated with an overrich fuel-air mixture.

It is an object of the present invention to provide a method of controlling the fuel-air ratio of an internal combustion engine in which method no carburetors and no air mass flow rate sensors are required.

In the method of the present invention the combustion chamber and its contents are preheated at times when the engine is started from cold and during other operative conditions of thermal energy deficiency, the engine is operated with a lean fuel-air mixture from the very beginning when the engine is started, and the fuel-air ratio is controlled exclusively by oxygen sensor means in the exhaust gas.

In making the present invention it has been realized that preheating the combustion chamber and its contents with resulting high combustion temperatures allows to operate the engine with a lean fuel-air mixture from the very beginning when the engine is started.

While there is no normal warm-up phase due to the instantaneous increase of the combustion chamber temperature to a value suitable for lean mixture operation, a slight delay for the oxygen sensor means in the exhaust gas stream to become effective can hardly be avoided.

This is why the air-fuel ratio preferably is adjusted by controlling the air mass flow rate on the basis of experimental data and general data during the period of starting the engine.

Alternatively, the oxygen sensor means is preheated before the engine is started.

According to a further advantageous development of the present invention for use in an automotive internal combustion engine associated with a driver pedal, the amount of fuel is influenced by the driver pedal and the fuel-air ratio is preselected on the basis of general operative data and is controlled by sensing any excess oxygen in the exhaust gas by means of said oxygen sensor means.

With reference to the drawing, the only figure of which shows diagrammatically a cross-section of a piston cylinder assembly of an internal combustion engine, the present invention will be further described.

The drawing shows only one cylinder 10 of an internal combustion engine, which cylinder 10 slidingly receives a reciprocable piston 12. An inlet passage 14 opens into a combustion chamber 18 with an inlet valve 16 being disposed at the location where the inlet passage 14 opens into the combustion chamber 18. An exhaust passage 20 is in fluid communication with the combustion chamber 18 via an outlet valve 22.

The inlet passage 14 receives air via an air filter 23 and an intake manifold 24, the air being drawn into the combustion chamber 18 by the piston 12 during the suction stroke when the inlet valve 16 has been opened. Furthermore, the air filter 23 may be followed by a charger device 26 for precharging or precompressing the air. If desired the fuel may be fed into the air flowing through inlet passage 14 so that a fuel air mixture instead of air flows through the inlet valve 16 into the combustion chamber 18.

A pre-requisite of the present invention is to provide for a sufficiently high combustion chamber temperature from the very beginning when the engine is started. This may be obtained for example by preheating the combustion air in heat exchanger means.

In the embodiment shown in the drawing the energy for heating the combustion chamber to the required temperature is provided by piston work; provisions are made to ensure that piston work is used not only to feed the desired amount of air or combustion gas, but also to provide excess energy which is converted into thermal energy within the combustion chamber.

In order to control the amount of supplied air in accordance with the actual demand and to meet the demand for excess kinetic energy to be converted into thermal energy within the combustion chamber, the inlet passage 14, at a location upstream of inlet valve 16, includes an additional valve 28 which is arranged to fully or partially close inlet passage so as to fully or partially restrict fluid flow therethrough. A control unit 30 indicated only in a diagrammatic manner is associated with the additional valve 28. The control unit 30 receives via a line 31 signals from an oxygen sensor 33 disposed in the exhaust gas stream, via a line 32 signals indicative of the operative condition of the engine and, if desired, signals representing the commands of a driver of an associated automotive vehicle.

The additional valve 28 allows to supply the combustible gas into the combustion chamber 18 in two partial streams during two phases.

Initially the additional valve 28 may be open so that a charge of air or of a fuel air mixture may flow into the cylinder 10. In response to signals from the control unit 30 the additional valve 28 may be moved to a closed or intermediate position so as to fully or partially restrict the supply of combustible gas to the combustion chamber 18 during a first phase. It is to be understood that during said first phase there may be no supply of combustible gas at all or a restricted supply of combustible gas.

During such closed or throttled condition of the additional valve 28 the pressure within the combustion chamber 18 is reduced by the respective piston work. When in a second phase the additional valve 28 is reopened, the pressure reduction in the combustion chamber 18 causes the combustible gas to flow into the combustion chamber 18 at an increased velocity. When the combustible gas flowing at the increased velocity is slowed down in the combustion chamber 18, this causes an additional compression of the combustible gas resulting in an increase of the pressure and temperature of the charge within the cylinder 10. In other words, the kinetic energy of the inflowing combustible gas is converted into thermal energy. By appropriate selection of the duration and the times of beginning and terminating restriction of fluid flow through the additional valve 28 the additional kinetic energy is determined so that the excess energy converted into thermal energy causes an increase of the temperature within the combustion chamber to a desired level.

In order to select the mass flow rate of the combustible gas according to the actual demand of the engine independently of any desired temperature increase, the duration of fluid flow in the second phase is controlled and, if necessary, is terminated by closing the additional valve 28 before the inlet valve 16 is closed. In this connection any flow of combustible gas into the combustion chamber during the first phase will have to be taken into account.

Because the temperature of the combustion chamber may be maintained at a level allowing for lean mixture operation of the engine from the very beginning when the engine is started, the usual air mass flow rate sensor or carburetor for controlling the fuel air ratio may be dispensed with. Control of the engine is performed by means of the oxygen sensor 33 disposed in the exhaust passage 20 so as to sense the oxygen content in the exhaust gas. This allows to reduce the costs at least in an engine system using a three-way catalytic converter, but also to reduce pollutant emission at times when the engine is started from cold and during normal operation of the engine, and to cut down the fuel consumption rate.

What is claimed is:

1. A method of controlling air-fuel ratio in an internal combustion engine comprising:

providing an internal combustion engine including a combustion chamber with a piston, intake means enabling fuel and air to enter into said combustion chamber and exhaust means for enabling exit of exhaust gases, valve means for controlling air-fuel into said piston in said intake means;

preheating said combustion chamber to a desired temperature;

injecting a desired amount of an air-fuel ratio mixture into said combustion chamber, said air-fuel ratio mixture injected in two partial streams by opening and closing said valve means the amount of fuel may vary from zero to a desired amount;

controlling the amount of the air-fuel ratio mixture entering into said combustion chamber; and sensing the exhaust gases for enabling adjustment of said air-fuel ratio entering said combustion chamber.

2. An internal combustion engine comprising:

a combustion chamber having a reciprocating piston;

an intake means for enabling an air-fuel mixture to enter into said combustion chamber;

an exhaust means for enabling exhaust gases to exit said combustion chamber;

valve means for throttling said air-fuel mixture entering into said combustion chamber, said valve means coupled with said intake means;

sensing means for sensing elements in said exhaust gases, said sensor means coupled with said exhaust means; and control means for controlling and adjusting the ratio of the air-fuel mixture entering into said combustion chamber, said control means associated with said sensor means and said valve means and said valve means supplying the combustible gas into said combustion chamber in two partial streams during two phases.

* * * * *